(12) United States Patent
Kelly et al.

(10) Patent No.: US 10,726,982 B2
(45) Date of Patent: Jul. 28, 2020

(54) SOLENOID INCLUDING AXIALLY ALIGNED GUIDES

(71) Applicant: Hamilton Sundstrand Corporation, Charlotte, NC (US)

(72) Inventors: Myles R. Kelly, Willimantic, CT (US); James S. Elder, South Windsor, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 172 days.

(21) Appl. No.: 15/883,620

(22) Filed: Jan. 30, 2018

(65) Prior Publication Data

US 2019/0237230 A1 Aug. 1, 2019

(51) Int. Cl.
| | |
|---|---|
| *H01F 3/14* | (2006.01) |
| *F16K 31/06* | (2006.01) |
| *H01F 7/16* | (2006.01) |
| *H01F 7/08* | (2006.01) |

(52) U.S. Cl.
CPC ............... *H01F 3/14* (2013.01); *F16K 31/06* (2013.01); *H01F 7/1607* (2013.01); *H01F 2007/085* (2013.01); *H01F 2007/163* (2013.01)

(58) Field of Classification Search
CPC .................................................. H01F 2007/163
See application file for complete search history.

(56) References Cited

U.S. PATENT DOCUMENTS

| | | | |
|---|---|---|---|
| 2,993,511 | A | 7/1961 | Johnson |
| 3,985,333 | A | 10/1976 | Paulsen |
| 5,326,070 | A | 7/1994 | Baron |
| 6,778,049 | B1 | 8/2004 | Alyanak |

FOREIGN PATENT DOCUMENTS

| | | |
|---|---|---|
| DE | 102005050276 | 4/2007 |
| DE | 102005051177 | 5/2007 |
| JP | S5593771 | 7/1980 |
| JP | S6014410 | 1/1985 |
| JP | H09153409 | 6/1997 |
| JP | 2014119031 | 6/2014 |

OTHER PUBLICATIONS

European Search Report for Application No. 19154575.5 dated Jun. 25, 2019.

*Primary Examiner* — Ramon M Barrera
(74) *Attorney, Agent, or Firm* — Carlson, Gaskey & Olds, P.C.

(57) ABSTRACT

A solenoid includes a coil defining an axis, an armature disposed radially inward of the coil, and a plurality of linear guides disposed at least partially between a radially inward facing surface of the coil and a radially outward facing surface of the armature. Each of the linear guides has a frictional surface area, with a dimension of the frictional surface area aligned with the axis being larger than a dimension of the frictional surface area aligned with a circumference of the coil.

20 Claims, 3 Drawing Sheets

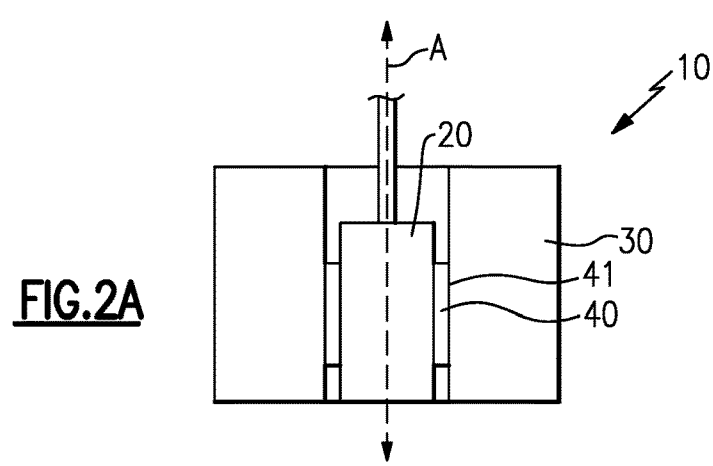
FIG.2A
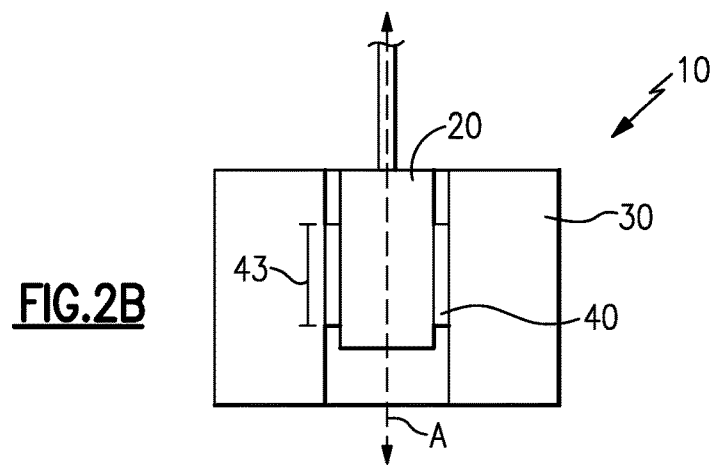
FIG.2B
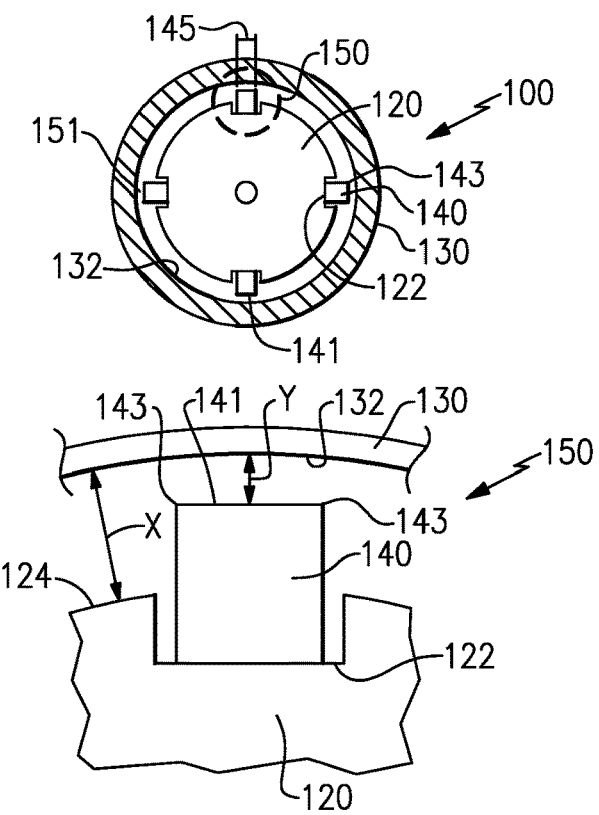
FIG.3
FIG.4

US 10,726,982 B2

SOLENOID INCLUDING AXIALLY ALIGNED GUIDES

TECHNICAL FIELD

The present disclosure relates generally to linear solenoids, and more specifically to a solenoid including axially aligned armature guides.

BACKGROUND

Linear solenoids are constructed of an armature disposed within a conductive coil. When electricity is applied to the conductive coil, a magnetic field is created resulting in a force on a ferromagnetic armature causing a displacement of the armature along the axis of the coil. The displacement, in turn, causes a shaft connected to the armature to also shift along the axis. In some cases, such as those where the linear solenoid is subjected to vibrations, or is angled relative to a force of gravity, the armature can contact the interior surface of the coils. The contact between the armature and the coils can result in fretting wear and/or galling. The wear, in turn, can cause degradation in the performance of the linear solenoid, and can increase the amount of electrical energy required to allow the linear solenoid to function.

One solution that has been attempted in the art is disposing guide rings in a circumferential groove around the armature and between the interior surface of the coil and the exterior surface of the armature. However, sizing the guide rings can be difficult and an improper sizing can result in further fretting wear, the creation of debris, or armature to bore contact. Further, placing the guide rings in a circumferential groove allows the armature to move axially within the gap between the guide ring and groove and provides little resistance to armature rotation. As used herein, the bore refers to the radially interior surface of the coil component. Further, in some examples, the guide rings can cause the armature to rotate within the coils when exposed to vibrations and the rotation can further increase fretting wear.

Additionally, guide rings can form a seal around the armature which allows for a delta pressure to act on the armatures area, slowing the reaction time of the armature. The reduced reaction time is typically mitigated by drilling a hole in the armature to allow pressure to equalize. However, drilling a hole in the armature can affect the magnetic force or create a gap in the guide ring.

SUMMARY OF THE INVENTION

In one exemplary embodiment a solenoid includes a coil defining an axis, an armature disposed radially inward of the coil, and a plurality of linear guides disposed at least partially between a radially inward facing surface of the coil and a radially outward facing surface of the armature, each of the linear guides having a frictional surface area, with a dimension of the frictional surface area aligned with the axis being larger than a dimension of the frictional surface area aligned with a circumference of the coil.

An exemplary method of assembling a solenoid includes disposing an armature within a coil, and disposing a plurality of linear guides between the armature and the coil, each of the linear guides having a frictional surface area, with a dimension of the frictional surface area aligned with an axis of the coil being larger than a dimension of the frictional surface area aligned with a circumference of the coil.

These and other features of the present invention can be best understood from the following specification and drawings, the following of which is a brief description.

BRIEF DESCRIPTION OF THE DRAWINGS

FIG. 2A schematically illustrates a cross section of an exemplary linear solenoid while in a first position.

FIG. 2B schematically illustrates the cross section of the exemplary linear solenoid of FIG. 2A while in a second position.

FIG. 3 schematically illustrates a top view of a linear solenoid disclosed herein incorporating linear guides.

FIG. 4 schematically illustrates a cross section of the view of FIG. 3 in greater detail.

DETAILED DESCRIPTION

Figure 1:
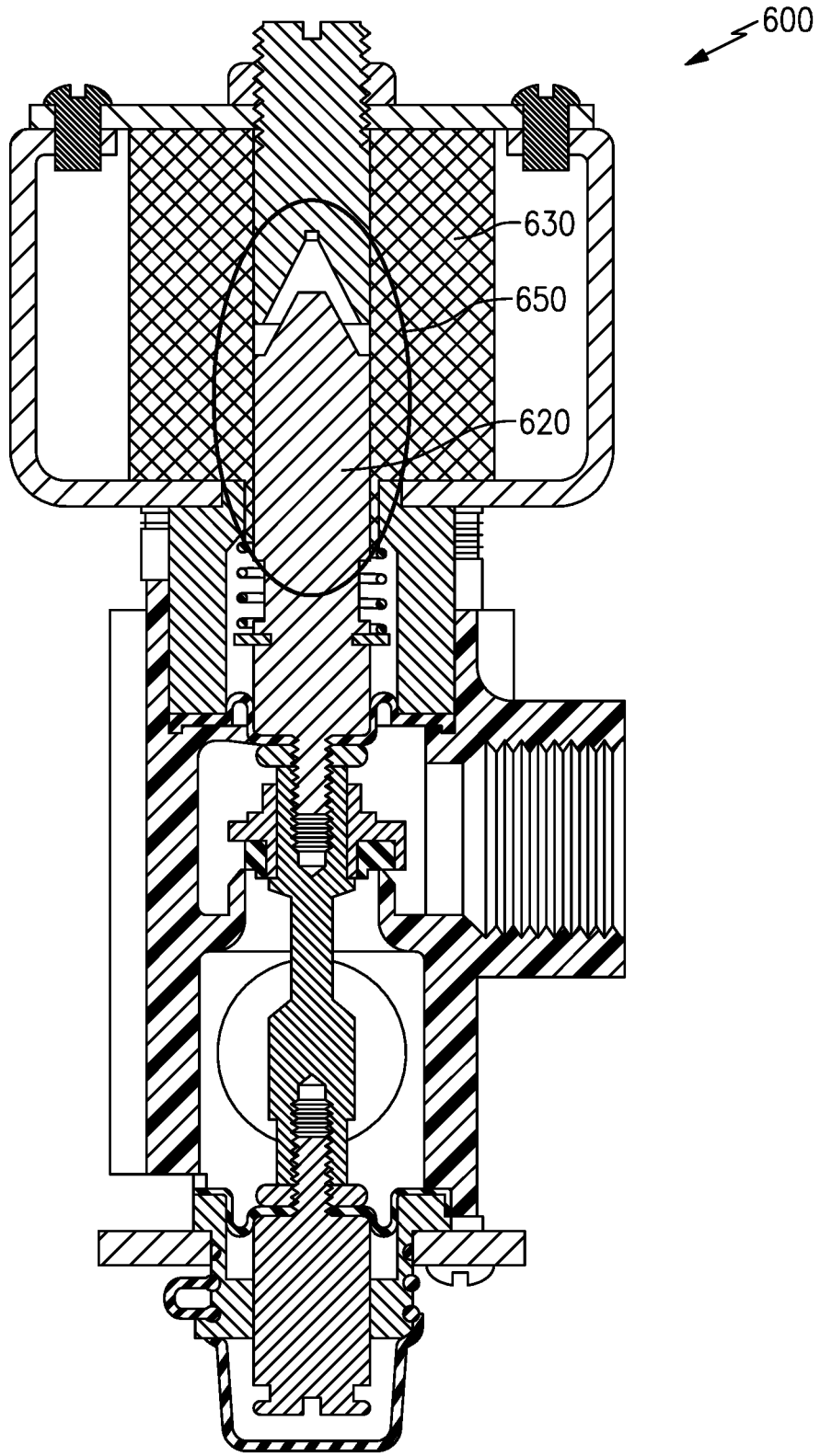
FIG. 1 schematically illustrates a cross section of a prior art linear solenoid.

FIG. 1 schematically illustrates a cross section of an exemplary prior art linear solenoid 600. The prior art linear solenoid 600 includes an armature 620 disposed within a coil 630. As can be seen in a circled region 650, the armature 620 is disposed within the coil 630 without any guide bars between the armature 620 and the windings 630.

FIGS. 2A and 2B schematically illustrates a cross section of a portion of an exemplary linear solenoid 10 including an armature 20 disposed radially inward of a coil 30. The illustrated portion corresponds approximately to the circled region 650 of the prior art linear solenoid 600 of FIG. 1. A set of linear guides 40 are disposed radially inward of the coil 30 and radially outward of the armature 20, relative to an axis defined by the coil 30. FIG. 2A illustrates the linear solenoid 10 in a first position when no current is applied to the coil 30. When an electrical current is applied to the coil 30, the electromagnetic field interaction with the armature 20, causes the armature 20 to shift along the axis A defined by the coil 30. FIG. 2B illustrates the positioning of the armature 20, relative to the coil 30, while the coil 30 is energized by applying electrical current to the coil 30. The electrical current can be applied from any known electrical power source and controlled via a controller according to known solenoid control techniques.

In the example of FIGS. 2A and 2B, the armature 20 is a cylinder, with the linear guides 40 contacting the exterior surface of the cylinder and the radially inner surface of the coils 30. In some examples, the linear guides 40 are compressed between the coil 30 and the armature 20. The linear guides 40 are maintained in position within the linear solenoid 10 via a spring force resulting from the compression. By way of example, the linear guide 40 can be a leaf spring causing it to generate a radially outward spring force while compressed. As used herein an axially aligned linear guide refers to a linear guide with at least one dimension aligned with the axis A, and where the linear guide 40 does not extend a full circumference of the armature. In one particular example, a largest dimension of the linear guides 40 is the dimension aligned with the axis A. In the illustrated example of FIGS. 2A and 2B, the linear guides 40 shift along with the armature 20, and are generally maintained in a static position relative to the armature 20. In alternative examples, the linear guides 40 can be maintained static relative to the coil 30 and do not shift along with the armature 20.

In one alternative example, the linear guides 40 can be further maintained in position via an adhesive contacting a surface of the linear guide 40. In another alternative example, such as the example illustrated in FIGS. 2 and 3, the linear guide 40 can be maintained in position relative to one of the coil 30 and the armature 20 via a keyed or notched fit within the armature 20. In yet further alternative examples, the above mechanisms for maintaining the linear guides 40 in position can be used in any combination with each other.

The inclusion of linear guides 40 aligned with the axis A defined by the coil 30, and thus aligned with the motion of the armature 20, provides a frictional surface area 41 having a small dimension 145 (illustrated in the example of FIG. 3) aligned with a circumference of the coil 30, relative to a dimension 143 of the frictional surface area 41 aligned with the axis A. The large dimension 43 of frictional surface area 41 being aligned with the axis A increases the resistance to rotation of the armature 20 within the coil 30. The relatively minimal dimension 145 of the frictional surface area 41 reduces the magnitude of electrical energy required to drive a shift in the position of the armature 20. In contrast, ring guides incorporated in the prior art have a substantially larger dimension of the frictional surface area perpendicular to the axis, relative to the dimension of the frictional surface area that is aligned with the axis, increasing the likelihood of rotation within the coil 30. The relatively larger frictional surface area also increases the electrical energy required to drive a shift in position of the armature. The linear guides 40 also reduce the risk of a pressure differential acting on the armature area. While the large dimension 43 and the relatively minimal dimensions 43 are illustrated as linear dimensions of the surface area, one of skill in the art will appreciate that the dimension aligned with the axis A (dimension 43) refers to the length of the frictional surface area 41 from a first end along the axis A to a second end, opposite the first end, along the axis A. Similarly, the smaller dimension 145 refers to a first end position along the circumference of the coil 40 to a second end opposite the first end along the circumference of the coil 40.

While only two linear guides 40 are visible in the view of FIGS. 2A and 2B, it is appreciated that any number of linear guides 40 can be utilized. In one example, the linear solenoid 10 utilizes four or more linear guides 40 distributed evenly about a circumference of armature 20. In another alternative, exactly four linear guides 40 are used. Examples utilizing an even circumferential distribution of linear guides 40 are typically used in vertically oriented linear solenoids 10, or linear solenoids 10 where the orientation relative to gravity of the linear solenoid 10 in an end installation is either variable or unknown.

In another example, the linear solenoid 10 utilizes four linear guides distributed unevenly about the armature 20. By way of example, a linear solenoid 10 in which the linear solenoid 10 will be oriented horizontally relative to gravity can utilize linear guides 40 disposed about a bottom half of the circumference of the armature 20. In alternative configurations, alternative distributions of the linear guides 40 can be utilized depending on the intended use and orientation of the linear solenoid 10 incorporating the linear guides 40.

With continued reference to FIGS. 2A and 2B, FIG. 3 schematically illustrates an end view of an alternate linear solenoid 100. As with the example of FIGS. 2A and 2B, the linear solenoid 100 includes an armature 120 disposed within a coil 130. Disposed between the armature 120 and the coil 130 are multiple linear guides 140. Each of the linear guides 140 is situated within a corresponding notch 122 in the armature 120 (the notch 122 can also be referred to as a radial intrusion into the armature 120). The notch 122 intrudes into the armature 120 and maintains the position of the corresponding linear guide 140 due to the fit. While illustrated in FIG. 3 as including gaps 151 between the coil 130 and the linear guides 140 for illustrative purposes, one of skill in the art will appreciate that the edges 143 of the frictional surface area 141 of the linear guides 140 contact the interior surface (radially inward facing surface 132) of the coil 130 in a fully assembled linear solenoid 100.

In some examples, the linear guide 140 can be loose fit to the notch 122, and adhered in the notch 122 via an adhesive or via a compressive force between the radially inward facing surface 132 of the coil 130 and the armature 120. In alternative examples, the linear guide 140 can be slotted into the notch in a tight fit, and the tight fit can prevent the linear guide 140 from being misaligned. As used herein a loose fit refers to a fit including no dimensional overlap, and a tight fit refers to a fit where the components include at least one dimension that overlaps.

With continued reference to FIG. 3, FIG. 4 schematically illustrates a zoomed in section 150 of the end view of FIG. 3. As can be appreciated by one of skill in the art, any manufacturing process will necessarily include tolerances with the end result of a given component having a range of dimensions as a result of the tolerances. In order to account for the tolerances, and maintain proper operation of the linear guides 140, the linear guides 140 are designed to have a maximum gap distance Y between the radially outer edge (the frictional surface area 141) of the linear guide 140 and the radially inward facing surface 132 of the coil 130. The maximum gap distance Y is designed to be smaller than a minimum gap distance X between a radially outward facing surface 124 of the armature 120 and the radially inward facing surface 132 of the coil 130. In one example, the maximum gap distance Y is at most 30% of the minimum gap distance X. In alternative examples, the gap distance scaling can be different depending on the needs of the specific linear solenoid. In a fully assembled practical linear solenoid 100, at least one portion of each linear guide 140 will contact the radially inward facing surface 132 of the coil 130, with the gap distances X, Y being maintained at at least a portion of the linear guide and the armature.

With continued reference to FIGS. 2A-4, the utilization of linear guides 40, 140 allows the armature 20, 120 to shift along the axis unimpeded even when a buildup of debris occurs within the gap between the armature 20, 120 and the coil 30, 130. The unimpeded motion is facilitated by the ability of the debris to fall in the circumferential spaces between the linear guides 40, 140.

Figure 5:
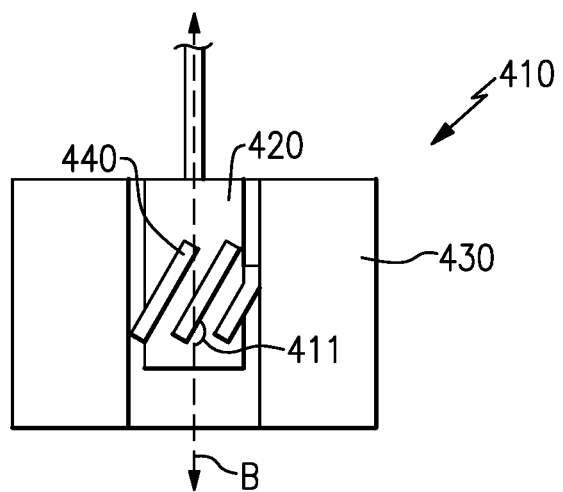
FIG. 5 schematically illustrates a cross section of a linear solenoid disclosed herein including angled linear guides.

FIG. 5 schematically illustrates an alternate example linear solenoid 410. As with the linear solenoid 10 of FIGS. 2A and 2B, the linear solenoid 410 includes an armature 420 disposed radially inward of a coil 430. A set of linear guides 440 are disposed radially inward of the coil 430 and radially outward of the armature 420, relative to an axis defined by the coil 430. Unlike the example of FIGS. 2A and 2B, where the linear guides 40 are fully axially aligned (parallel with the axis A), the linear guides 440 of the linear solenoid 410 of FIG. 5 are arranged at an angle 411 relative to the axis B.

Figure 6:
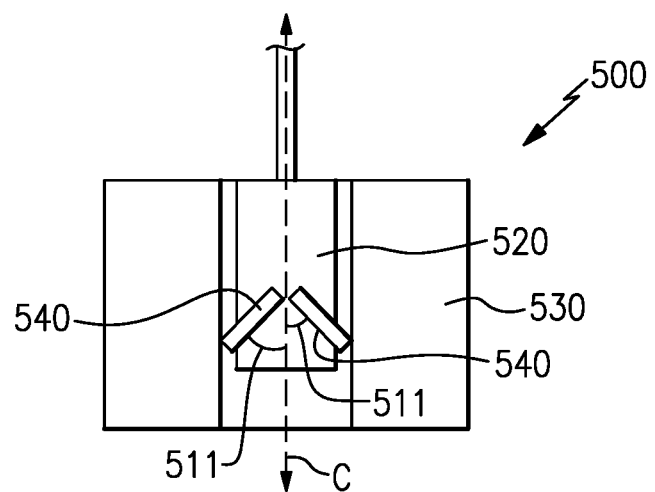
FIG. 6 schematically illustrates a cross section of an exemplary linear solenoid including sawtooth linear guides.

Similarly, FIG. 6 schematically illustrates another alternate example linear solenoid 510 including an armature 520 disposed radially inward of a coil 530. A set of linear guides 540 are disposed radially inward of the coil 530 and radially outward of the armature 520, relative to an axis defined by the coil 530. The linear guides in the example of FIG. 6 are arranged at complementary angles 511 relative to the axis C, with the angle of the linear guides being alternated around the circumference between two opposed angles. This alternating angle is referred to as a sawtooth configuration. In alternative examples, the angles 511 are opposite, but are not necessarily complementary.

While described above in general terms as including linear guides 40, 140, one of skill in the art will appreciate that in some examples the linear solenoid can be further defined by the absence of other types of guides, such as ring guides, partial ring guides, and the like. In such an example, the linear guides 40, 140 have a dimension along the circumference of the armature 20, 120 that is smaller than a dimension along the axis A.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A solenoid comprising:
    a coil defining an axis;
    an armature disposed radially inward of the coil; and
    a plurality of linear guides disposed at least partially between a radially inward facing surface of the coil and a radially outward facing surface of the armature, each of said linear guides having a frictional surface area, with a dimension of the frictional surface area aligned with the axis being larger than a dimension of the frictional surface area aligned with a circumference of the coil, and wherein at least one linear guide in the plurality of linear guides is at an oblique angle relative to the axis.

2. The solenoid of claim 1, wherein said plurality of linear guides includes at least four linear guides.

3. A solenoid comprising:
    a coil defining an axis;
    an armature disposed radially inward of the coil; and
    a plurality of linear guides disposed at least partially between a radially inward facing surface of the coil and a radially outward facing surface of the armature, each of said linear guides having a frictional surface area, with a dimension of the frictional surface area aligned with the axis being larger than a dimension of the frictional surface area aligned with a circumference of the coil, and wherein each linear guide of said plurality of linear guides is at an oblique angle relative to the axis.

4. The solenoid of claim 3, wherein the plurality of linear guides are configured in a sawtooth arrangement.

5. The solenoid of claim 1, wherein the frictional surface are of each linear guide in said plurality of linear guides has a largest dimension approximately parallel to the axis defined by the coil.

6. The solenoid of claim 1, wherein the plurality of linear guides are evenly distributed about a circumference of the armature.

7. A solenoid comprising:
    a coil defining an axis;
    an armature disposed radially inward of the coil;
    a plurality of linear guides disposed at least partially between a radially inward facing surface of the coil and a radially outward facing surface of the armature, each of said linear guides having a frictional surface area, with a dimension of the frictional surface area aligned with the axis being larger than a dimension of the frictional surface area aligned with a circumference of the coil; and
    wherein the plurality of linear guides are unevenly distributed about a circumference of the armature.

8. The solenoid of claim 1, wherein each linear guide in said plurality of linear guides has an axial dimension that is longer than each other dimension of the linear guide.

9. The solenoid of claim 1, wherein the armature includes a plurality of notches radially intruding into the armature, and wherein each of said linear guides is at least partially disposed in a corresponding notch in said plurality of notches.

10. The solenoid of claim 9, wherein each of said linear guides is press fitted within the corresponding notch.

11. The solenoid of claim 9, wherein circumferential clearance exists between each of said linear guides and the corresponding notch.

12. The solenoid of claim 1, wherein a first gap is defined between a radially outward facing surface of the armature and a radially inward facing surface of the coil, a second gap is defined between the frictional surface area of each linear guide of the plurality of linear guides and the radially inward facing surface of the coil, and wherein the first gap is larger than the second gap.

13. The solenoid of claim 12, wherein the second gap is a largest distance between the radially outward facing surface of the linear guide and the radially inward facing surface of the coil.

14. The solenoid of claim 1, wherein each of said linear guides is a leaf spring.

15. The solenoid of claim 1, wherein each of said linear guides is maintained in position relative to one of the armature and the coil via a connection to the one of the armature and the coil.

16. The solenoid of claim 15, wherein the connection is an adhesive connection.

17. A method of assembling a solenoid comprising:
    disposing an armature within a coil; and
    disposing a plurality of linear guides between the armature and the coil, each of said linear guides having a frictional surface area, with a dimension of the frictional surface area aligned with an axis of the coil being larger than a dimension of the frictional surface area aligned with a circumference of the coil and wherein at least one linear guide in the plurality of linear guides is at an oblique angle relative to the axis of the coil.

18. The method of claim 17, wherein disposing the plurality of linear guides between the armature and the coil includes at least partially disposing each of said linear guides within an intrusion into the armature.

19. The method of claim 17, further comprising maintaining each of said linear guides of the plurality of linear guides in position relative to the armature and the coil at least partially via one of a spring force and an adhesive.

20. The method of claim 17, wherein disposing the plurality of linear guides between the armature and the coil includes evenly distributing the linear guides about a circumference of the armature.

* * * * *

UNITED STATES PATENT AND TRADEMARK OFFICE
CERTIFICATE OF CORRECTION

PATENT NO. : 10,726,982 B2
APPLICATION NO. : 15/883620
DATED : July 28, 2020
INVENTOR(S) : Miles R. Kelly and James S. Elder Page 1 of 1

It is certified that error appears in the above-identified patent and that said Letters Patent is hereby corrected as shown below:

In the Claims

In Claim 5, Column 5, Line 56-57; replace "surface are of each linear" with --surface area of each linear--

Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*